(12) United States Patent
Gupta et al.

(10) Patent No.: US 7,774,521 B2
(45) Date of Patent: Aug. 10, 2010

(54) METHOD AND APPARATUS FOR REDUCING POWER CONSUMPTION FOR ISOCHRONOUS DATA TRANSFERS

(75) Inventors: Ajay Gupta, Hillsboro, OR (US); Sanjay Bakshi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 100 days.

(21) Appl. No.: 11/966,118

(22) Filed: Dec. 28, 2007

(65) Prior Publication Data

US 2009/0172431 A1 Jul. 2, 2009

(51) Int. Cl.
*G06F 3/00* (2006.01)
(52) U.S. Cl. .......................................... 710/54; 710/52
(58) Field of Classification Search .................... 360/39, 360/50; 375/240.01, 240.23, 240.26, 240.29; 377/40; 386/1, 35, 37, 39, 40, 124, 123, 386/109, 112, 95, 104, 96; 704/500–504; 710/1, 5, 7, 52, 56
See application file for complete search history.

(56) References Cited

U.S. PATENT DOCUMENTS

| 6,172,989 | B1 * | 1/2001 | Yanagihara et al. | 370/473 |
| 6,247,071 | B1 * | 6/2001 | Cardoso, Jr. | 710/52 |
| 2007/0153774 | A1 * | 7/2007 | Shay et al. | 370/352 |

* cited by examiner

*Primary Examiner*—Alford W Kindred
*Assistant Examiner*—Richard Franklin
(74) *Attorney, Agent, or Firm*—Kacvinsky LLC

(57) ABSTRACT

A method and article for reducing power consumption for isochronous data transfers are described. The method may include receiving packets of data having multimedia information with empty spaces. The packets of data may be stored in a first buffer having a first buffer size allocated for a universal serial bus processing stack. The empty spaces may be removed from the packets of data and the packets of data having the empty spaces removed may be copied to a second buffer having a second buffer size allocated for a media information processing stack. Other embodiments are described and claimed.

18 Claims, 5 Drawing Sheets

METHOD AND APPARATUS FOR REDUCING POWER CONSUMPTION FOR ISOCHRONOUS DATA TRANSFERS

BACKGROUND

A transition is taking place between analog television and digital television and digital television is becoming available on a vast array of digital devices. As digital devices continue to become more mobile, power conservation in the devices becomes an increasingly important consideration. Depending upon the underlying transfer mechanisms, however, certain data transfers may result in increased power consumption for the device. For example, in a universal serial bus (USB) implementation, isochronous data transfers may be utilized to transmit the digital television data. Isochronous data transfers, however, may result in stored data that contains empty spaces, resulting in inefficiencies and increased power consumption when the data is processed. Consequently, there exists a substantial need for techniques to improve the power consumption for isochronous data transfers.

DETAILED DESCRIPTION

Various embodiments may be generally directed to a method and apparatus for reducing power consumption for isochronous data transfers. In one embodiment, for example, packets of data having multimedia information with empty spaces may be received and stored in a first buffer having a first buffer size allocated for a universal serial bus processing stack. The empty spaces may be removed from the packets of data and the packets of data having the empty spaces removed may be copied to a second buffer having a second buffer size allocated for a media information processing stack. In this manner, the processor responsible for executing the multimedia information may more frequently enter a power conserving state and, as a result, reduce power consumption for the device. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment. Moreover, the techniques discussed herein may be applied in various environments, such as the networking environment discussed with reference to FIG. 1 and/or the computing systems discussed with reference to FIGS. 2 and 5.

Figure 1:
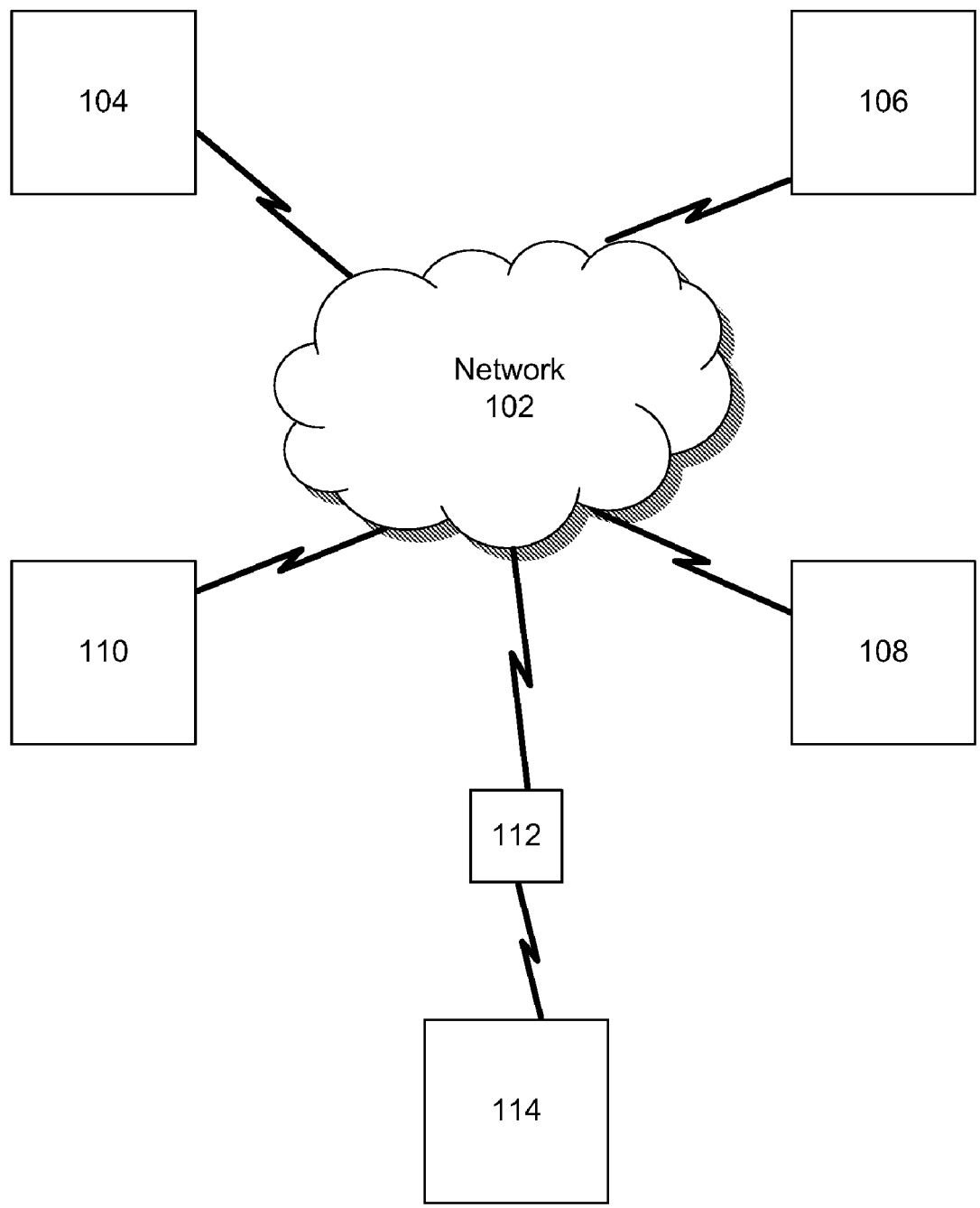
FIG. 1 illustrates one embodiment of a networking environment.

FIG. 1 illustrates various components of a networking environment 100, which may be utilized to implement various embodiments discussed herein. The environment 100 may include a network 102 to enable communication between various devices such as a server computer 104, a desktop computer 106 such as, for example, a workstation or a desktop computer, a laptop or notebook computer 108, a reproduction device 110, such as, for example, a network printer, copier, facsimile, scanner, all-in-one device, etc., a wireless access point 112, which may comprise a cellular base station in various embodiments, a personal digital assistant or smart phone 114, a rack-mounted computing system (not shown), etc. The network 102 may be any type of types of a computer network including an intranet, the Internet, and/or combinations thereof.

The devices 104-114 may communicate with the network 102 through wired and/or wireless connections. Hence, the network 102 may be a wired and/or wireless network. For example, as illustrated in FIG. 1, the wireless access point 112 may be coupled to the network 102 to enable other wireless-capable devices, such as the device 114 for example, to communicate with the network 102. In various embodiments, the wireless access point 112 may include traffic management capabilities. Also, data communicated between the devices 104-114 may be encrypted or cryptographically secured to limit unauthorized access.

The network 102 may utilize any communication protocol such as Ethernet, Fast Ethernet, Gigabit Ethernet, wide-area network (WAN), fiber distributed data interface (FDDI), Token Ring, leased line, analog modem, digital subscriber line (DSL and its varieties such as high bit-rate DSL (HDSL), integrated services digital network DSL (IDSL), etc.), asynchronous transfer mode (ATM), cable modem, and/or FireWire.

Wireless communication through the network 102 may be in accordance with one or more of the following: wireless local area network (WLAN), wireless wide area network (WWAN), code division multiple access (CDMA) cellular radiotelephone communication systems, global system for mobile communications (GSM) cellular radiotelephone systems, North American Digital Cellular (NADC) cellular radiotelephone systems, time division multiple access (TDMA) systems, extended TDMA (E-TDMA) cellular radiotelephone systems, third generation partnership project (3G) systems such as wide-band CDMA (WCDMA), etc. Moreover, network communication may be established by internal network interface devices (e.g., present within the same physical enclosure as a computing system) such as a network interface card (NIC) or external network interface devices (e.g., having a separate physical enclosure and/or power supply than the computing system to which it is coupled).

Figure 2:
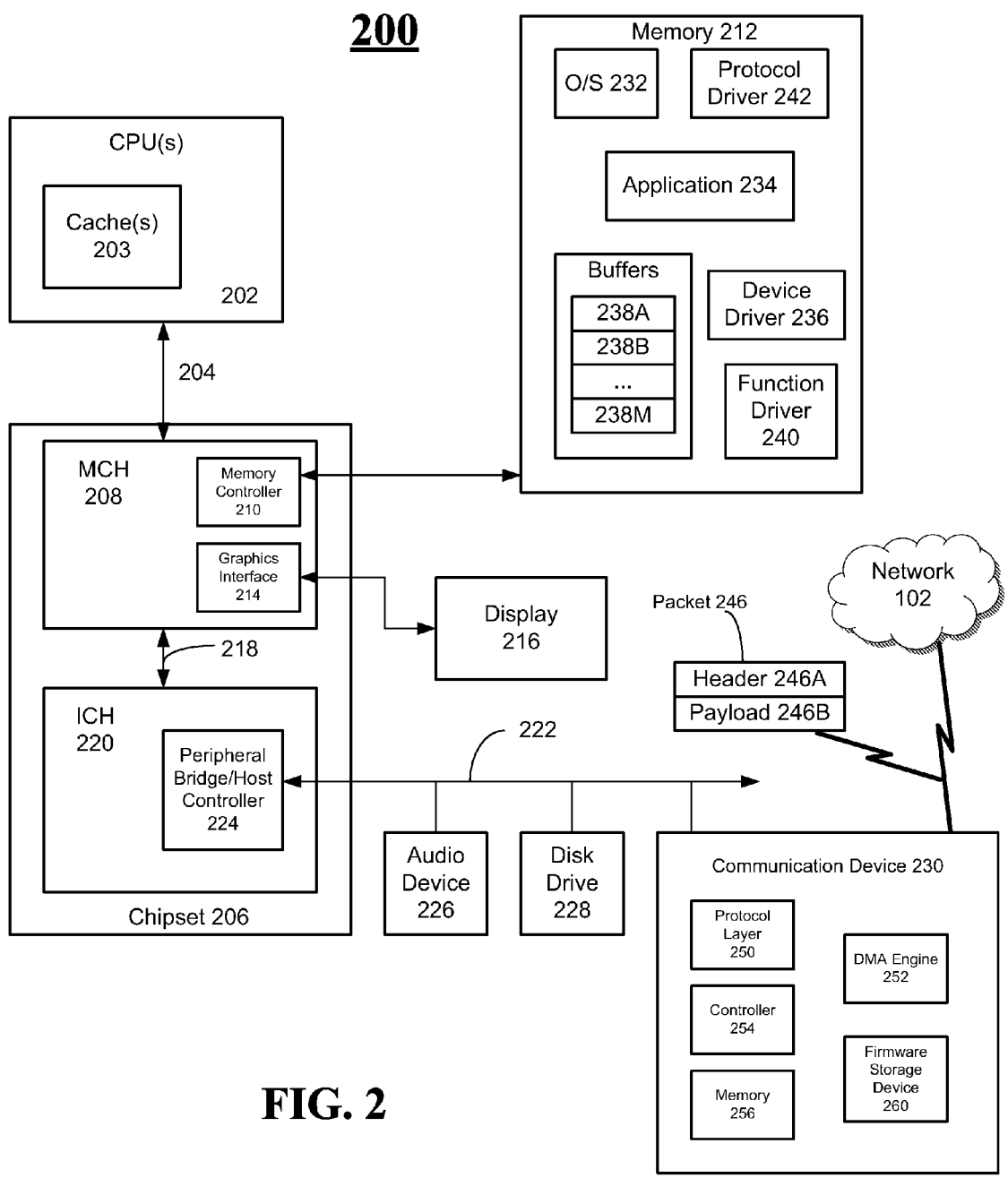
FIG. 2 illustrates a first embodiment of a first computing system.

FIG. 2 illustrates a block diagram of a computing system 200, in accordance with various embodiments. One or more of the devices 104-114 discussed with reference to FIG. 1 may comprise one or more of the components of the computing system 200. The computing system 200 may include one or more central processing unit(s) (CPUs) 202 (which may be collectively referred to herein as "processors 202" or more generally "processor 202") coupled to an interconnection network or bus 204. The processors 202 may be any type of processor such as a general purpose processor, a network processor (which may process data communicated over a computer network (102)), etc. (including a reduced instruction set computer (RISC) processor or a complex instruction set computer (CISC)). Moreover, the processors 202 may have a single or multiple core design. The processors 202 with a multiple core design may integrate different types of processor cores on the same integrated circuit (IC) die. Also, the processors 202 with a multiple core design may be implemented as symmetrical or asymmetrical multiprocessors.

The processor 202 may include one or more caches 203, which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache 203 may be any type of cache, such a level 1 (L1) cache, a level 2 (L2) cache, a level 3 (L-3), a mid-level cache, a last level cache (LLC), etc. to store electronic data (e.g., including instructions) that is utilized by one or more components of the system 200.

A chipset 206 may additionally be coupled to the interconnection network 204. The chipset 206 may include a memory control hub (MCH) 208. The MCH 208 may include a memory controller 210 that is coupled to a memory 212. The memory 212 may store data, e.g., including sequences of instructions that are executed by the processor 202, or any other device in communication with components of the computing system 200. In various embodiments, the memory 212 may include one or more volatile storage or memory devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 204, such as multiple processors and/or multiple system memories.

The MCH 208 may further include a graphics interface 214 coupled to a display device 216, e.g., via a graphics accelerator. In various embodiments, the graphics interface 214 may be coupled to the display device 216 via an accelerated graphics port (AGP). In various embodiments, the display device 216, which, for example may include a flat panel display or a cathode ray tube, may be coupled to the graphics interface 214 through, for example, a signal converter that translates a digital representation of an image stored in a storage device such as video memory or system memory into display signals that are interpreted and displayed by the display. The display signals produced by the display device 216 may pass through various control devices before being interpreted by and subsequently displayed on the display device 216.

As shown in FIG. 2, a hub interface 218 may couple the MCH 208 to an input/output control hub (ICH) 220. The ICH 220 may provide an interface to input/output (I/O) devices coupled to the computing system 200. The ICH 220 may be coupled to a bus 222 through a peripheral bridge or host controller 224, such as a peripheral component interconnect (PCI) bridge, a universal serial bus (USB) controller, etc. The controller 224 may provide a data path between the processor 202 and peripheral devices. Other types of topologies may be utilized. Also, multiple buses may be coupled to the ICH 220, for example, through multiple bridges or controllers. For example, the bus 222 may comply with the Universal Serial Bus Specification, Revision 1.1, Sep. 23, 1998, and/or Universal Serial Bus Specification, Revision 2.0, Apr. 27, 2000 (including subsequent amendments to either revision). Alternatively, the bus 222 may comprise other types and configurations of bus systems. Moreover, other peripherals coupled to the ICH 220 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 222 may be coupled to an audio device 226, one or more disk drive(s) 228, and a communication device 230, which in various embodiments may be a NIC or a tuner card. Other devices may be coupled to the bus 222. Also, various components such as the communication device 230 may be coupled to the MCH 208 in various embodiments. In addition, the processor 202 and the MCH 208 may be combined to form a single chip.

Additionally, the computing system 200 may include volatile and/or nonvolatile memory or storage. For example, nonvolatile memory may include one or more of the following: read-only memory (ROM), programmable ROM (PROM), erasable PROM (EPROM), electrically EPROM (EEPROM), a disk drive (e.g., 228), a floppy disk, a compact disk ROM (CD-ROM), a digital versatile disk (DVD), flash memory, a magneto-optical disk, or other types of nonvolatile machine-readable media capable of storing electronic data including instructions.

The memory 212 may include one or more of the following in various embodiments: an operating system (O/S) 232, application 234, device driver 236, buffers 238, function driver 240, and/or protocol driver 242. Programs and/or data stored in the memory 212 may be swapped into the disk drive 228 as part of memory management operations. The application(s) 234 may execute (e.g., on the processor(s) 202) to communicate one or more packets 246 with one or more computing devices coupled to the network 102 (such as the devices 104-114 of FIG. 1). In various embodiments, a packet may be a sequence of one or more symbols and/or values that may be encoded by one or more electrical signals transmitted from at least one sender to at least one receiver (e.g., over a network such as the network 102). For example, each packet 246 may have a header 246A that includes various information that may be utilized in routing and/or processing of the packet 246, such as a source address, a destination address, packet type, etc. Each packet may also have a payload 246B that includes the raw data or content the packet is transferring between various computing devices, for example, the devices 104-114 of FIG. 1, over a computer network such as the network 102.

In various embodiments, the application 234 may utilize the O/S 232 to communicate with various components of the system 200, e.g., through the device driver 236 and/or function driver 240. For example, the device driver 236 and function driver 240 may be used for different categories, e.g., device driver 236 may manage generic device class attributes, whereas the function driver 240 may manage device specific attributes (such as USB specific commands). In various embodiments, the device driver 236 may allocate one or more buffers (238A through 238M) to store packet data, such as the packet payload 246B. One or more descriptors (not shown) may respectively point to the buffers 238. In various embodiments, one or more of the buffers 238 may be implemented as circular ring buffers. Also, one or more of the buffers 238 may correspond to contiguous memory pages in various embodiments. Furthermore, a protocol driver 242 may implement a protocol driver to process packets communicated over the network 102, according to one or more protocols. In accordance with various embodiments, as discussed herein forth, reference to "function driver 240" may or may not refer to other types of drivers, e.g., including device driver 236, function driver 240, and/or protocol driver 242.

As illustrated in FIG. 2, the communication device 230 may include a network protocol layer 250 for implementing the physical communication layer to send and receive network packets to and from remote devices over the network 102. The network 102 may include any type of computer network such as those discussed with reference to FIG. 1. The communication device 230 may further include a direct memory access (DMA) engine 252, which may write packet data to buffers 238 to transmit and/or receive data over the network 102. Additionally, the communication device 230 may include a controller 254, which may include logic, such as a programmable processor for example, to perform communication device related operations. In various embodiments, the controller 254 may be a MAC (media access control) component. The communication device 230 may further include a memory 256, such as any type of volatile/nonvolatile memory (e.g., including one or more cache(s) and/or other memory types discussed with reference to memory 212).

In various embodiments, the communication device 230 may include a firmware storage device 260 to store firmware (or software) that may be utilized in management of various functions performed by components of the communication device 230. For example, the firmware may be used to configure various operations such as those discussed with reference to FIG. 5. The storage device 260 may be any type of a storage device such as a non-volatile storage device. For example, the storage device 260 may include one or more of the following: ROM, PROM, EPROM, EEPROM, disk drive, floppy disk, CD-ROM, DVD, flash memory, a magneto-optical disk, or other types of nonvolatile machine-readable media capable of storing electronic data, including instructions.

In various embodiments, communication device 230 may include or comprise a USB tuner card configured to receive and process multimedia information. The tuner card may comprise a component that receives digital television signals for any of devices 104-114 described in FIG. 1. In various embodiments, the tuner card may also function as video capture card, allowing the card to record multimedia information onto a hard disk. In various embodiments, the tuner card may comprise a USB express card, a USB mini-card, a USB half-mini card or any other suitable USB form factor card. The tuner card may contain a receiver, tuner, demodulator, and an analog-to-digital converter in various embodiments.

In various embodiments, the multimedia information comprises a digital television signal sent over network 102 from a media source (not shown) to the communication device 230. The multimedia information may comprise a constant bit rate signal for a given modulation rate, code rate and guard interval. The multimedia information may comprise generic coding of moving pictures and associated audio information. In various embodiments, the multimedia information comprises an MPEG2 transport stream. The multimedia information may contain multiple digital television channels or logical streams in each physical channel received from the media source. For example, the multimedia information may comprise various digital television channels, such as BBC 1, BBC 2, BBC 3 and BBC 4 in a single physical channel.

In various embodiments, the received multimedia information is converted from an analog signal to a digital signal using an analog-to-digital converter in the tuner card. Demodulation may also occur in the tuner card. In various embodiments, the multimedia information is also filtered in the tuner card to isolate the desired portion of the multimedia information. For example, the multimedia information may pass through a series of Program Identification (PID) filters in the tuner card to isolate the individual digital television channels contained in the physical channel. If a request for the channel BBC 1 has been received, for example, the multimedia information will be filtered by the PID filters and only the requested channel, BBC 1, will be sent in response to the request. Performing the filtering at the tuner card reduces the amount of data that is sent in response to a request for data and which reduces the amount of bandwidth used in the system.

In various embodiments, the filtered multimedia information is sent from the communication device 230 to the chipset 206 over bus 222. As a result of the processing performed in the communication device 230, the multimedia information sent over bus 222 to chipset 206 comprises variable bit rate data even though the information received from the media source comprises constant bit rate data.

In various embodiments, bus 222 may comprise a USB bus. Isochronous mode is one of the four data flow types for USB devices (the others being Control, Interrupt and Bulk). Isochronous mode is commonly used for streaming multimedia data types such as video or audio sources. In isochronous mode, a device can reserve bandwidth on the bus making isochronous mode desirable for multimedia applications. In various embodiments, the data transfer described herein utilizes isochronous mode.

The multimedia information passes through chipset 206 to memory 212 for storage and processing. The variable bit rate of the multimedia information being sent over bus 222 and the isochronous mode of data transfer, however, may result in empty spaces being present in the multimedia information stored in memory 212. As a result of the empty spaces, larger buffer size packets cannot be posted to the USB host controller driver leading to higher kernel mode CPU consumption. Further, larger size buffers cannot be circulated in the media processing graph due to the audio latency that would result when the multimedia information is retrieved. The net impact of these problems is that overall platform power consumption is higher for isochronous mode data transfers as compared to bulk mode transfers even though there is higher sleep state residency in isochronous mode compared to bulk mode.

In various embodiments, different buffering schemes can be deployed in memory 212 to reduce power consumption for isochronous mode data transfers. The different buffering schemes may be described in more detail with reference to FIG. 3.

Figure 3:
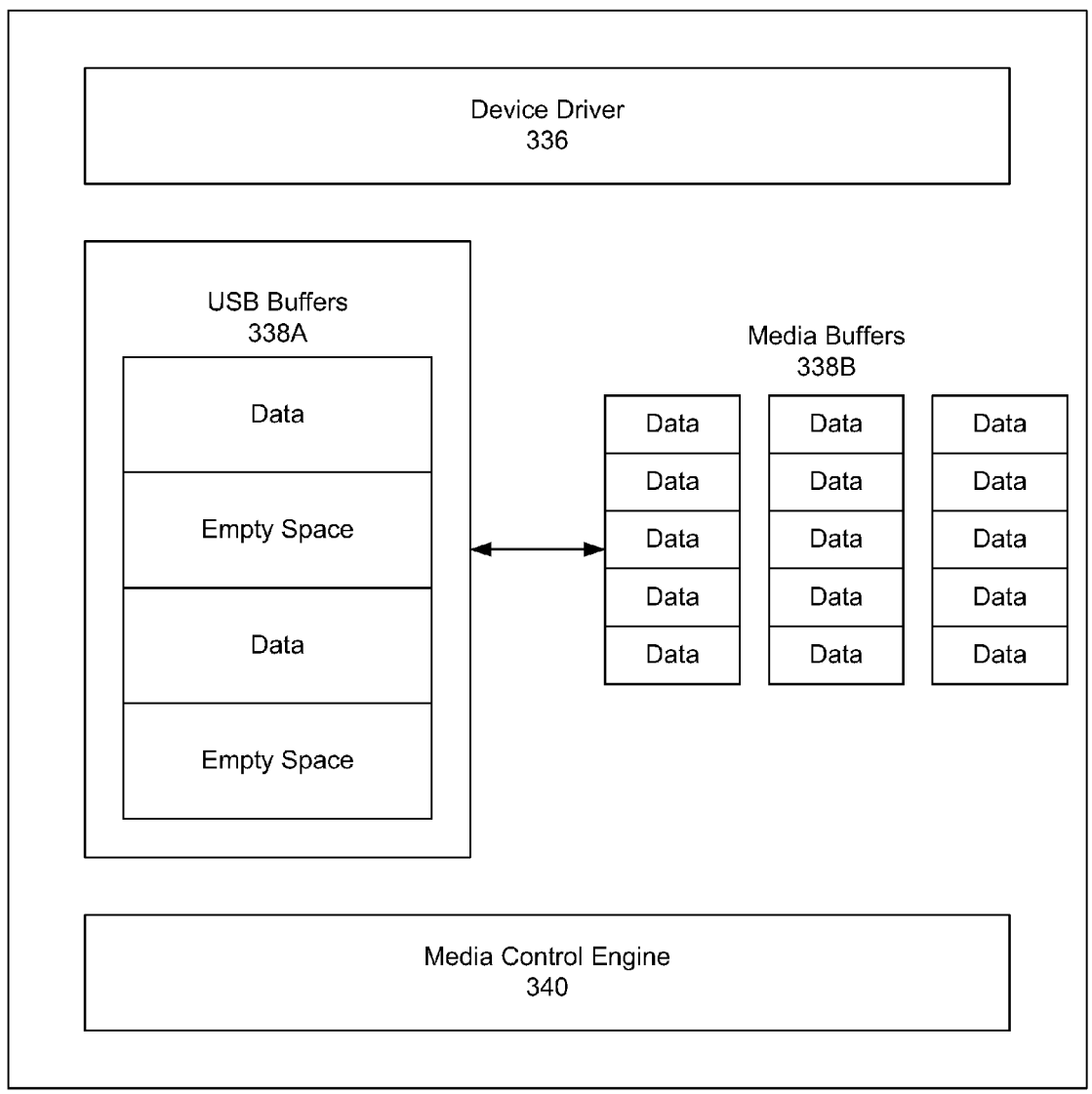
FIG. 3 illustrates one embodiment of a memory.

FIG. 3 illustrates one embodiment of a memory 300. Memory 300 may be representative of, for example, memory 212 shown in FIG. 2. As shown in FIG. 3, memory 300 comprises multiple elements, such as a device driver 336, USB buffers 338A, media buffers 338B and media control engine 340. The embodiments, however, are not limited to the elements shown in this figure.

Device driver 336 may comprise a component that handles interactions between memory 300 and any of the elements of computing system 200, for example. Device driver 336 may be responsible for allocating and managing buffers 338A and 338B. In various embodiments, device driver 336 allocates USB buffers 338A to be as large as the USB processing stack will allow. Device driver 336 may also allocate media buffers 338B, the size of media buffers 338B selected to reduce or eliminate audio latency when the multimedia information is retrieved.

USB buffers 338A may comprise a permanent or temporary allocation of memory to store multimedia information. As shown in FIG. 3, the multimedia information stored in USB buffers 338A may comprise data and empty spaces. If a system operating in isochronous mode attempts to retrieve the multimedia information stored in USB buffers 338A, the empty spaces result in increased processing requirements because the processor must locate the start of the data after the empty space. After the start of the data has been located, empty space are encountered which requires the processor to skip the empty space and again look for the start of the next portion of valid data. This increased processing results in increased power consumption for the device. As a result, it is advantageous to remove the empty spaces from the stored multimedia information.

In various embodiments, device driver 336 controls the making of a copy of the multimedia information from USB buffers 338A to media buffers 338B. In various embodiments, the empty spaces in the multimedia information stored in the USB buffers 338A are removed before the data is copied to the media buffers 338B. The media buffers 338B may comprise a second allocation of memory to store the multimedia information with the empty spaces removed. As shown in FIG. 3, the data stored in media buffers 338B does not contain any empty spaces as a result of the copying process controlled by device driver 336.

Media control engine 340 may comprise a component that controls requests for multimedia information. An example of a media control engine 340 is the Microsoft® DirectShow® application programming interface (API) by Microsoft® Corporation of Redmond, Wash. DirectShow is a media-streaming architecture for the Microsoft Windows® platform that allows applications to perform high-quality video and audio playback or capture. In various embodiments, media control engine 340 may retrieve requested multimedia data from media buffers 338B to fulfill requests for specific multimedia information, for example, a specific television channel or program and provide the requested information to processor 202 for further processing and playback.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
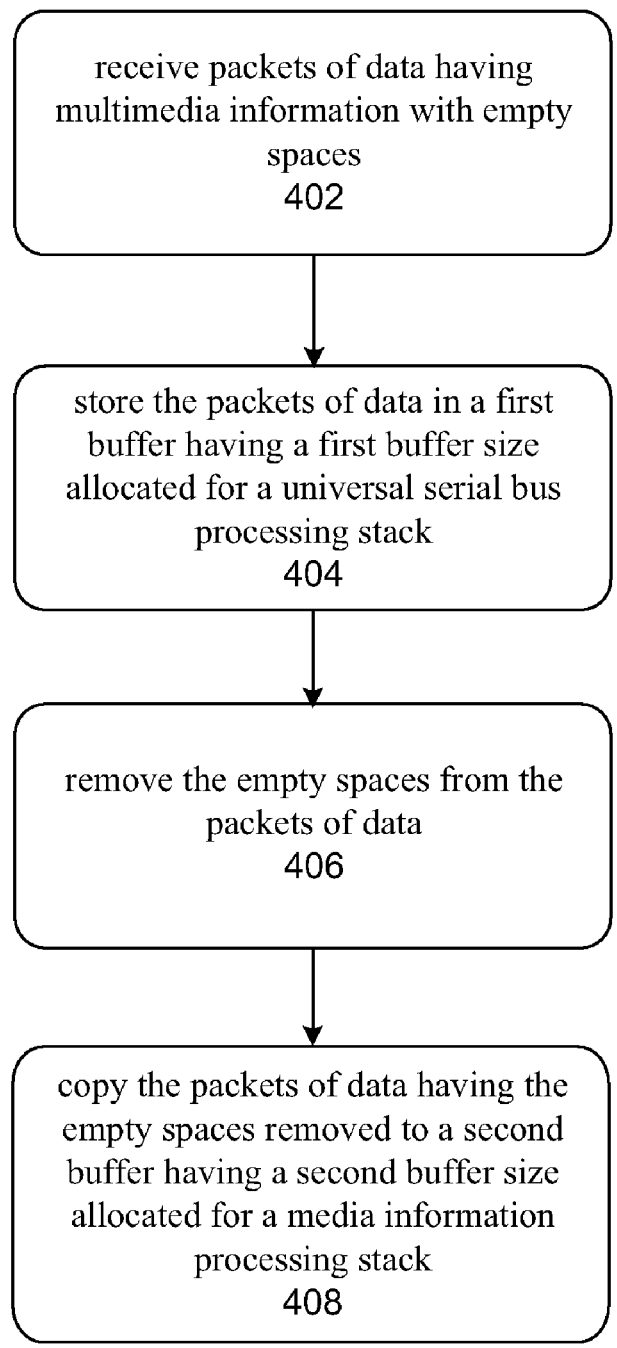
FIG. 4 illustrates one embodiment of a logic flow.

FIG. 4 illustrates one embodiment of a logic flow. FIG. 4 illustrates a logic flow 400. Logic flow 400 may be representative of the operations executed by one or more embodiments described herein. As shown in logic flow 400, packets of data having multimedia information with empty spaces are received at 402. In various embodiments, the packets of data having multimedia information comprise a variable bit rate digital television signal received at communication device 230.

The packets of data are stored in a first buffer having a first buffer size allocated for a universal serial bus processing stack at 404. In various embodiments, the first buffer may comprise USB Buffers 338A. The first buffer may be allocated such that the buffer size is as large as the USB processing stack will allow. The larger size of the first buffer allows a processor, such as processor 202, to conserve power by entering a power conserving states more frequently. The power conserving states may comprise C-states, for example. In various embodiments, the higher or deeper the C-state, the more likely the processor can be shut down and therefore realizing greater the power savings.

The empty spaces are removed from the packets of data at 406. The process of removing the empty spaces may be controlled, in various embodiments, by device driver 336. The empty spaces result from the system operating in isochronous mode and the packets of data being variable bit rate data.

The packets of data having the empty spaces removed are copied to a second buffer having a second buffer size allocated for a media information processing stack at 408. The second buffer may comprise, for example, media buffers 338B. The second buffer size is allocated such that the buffers are as large as possible, but not so large that latency, such as audio latency for example, occurs when the packets of data are retrieved from the second buffer. In various embodiments, the second buffer is allocated as one or more buffers and the first buffer size is larger than the second buffer size.

The packets of data are sent from the second buffer to the media information processing stack. In various embodiments, the media information processing stack further comprises a media control engine, such as media control engine 340, for demodulating, decoding and rendering the multimedia information. Examples of a media control engine comprise Microsoft DirectShow.

The packets of data are retrieved from the information processing stack for use by a processor. In various embodiments, the processor comprises processor 202. The processing performed by processor 202 may include, for example, rendering digital audio information and digital video information comprising a digital television signal and providing the digital television signal for playback on display 216.

The processor is placed in a power conserving state after processing the packets of data. Because the empty spaces have been removed from the packets of data during the copying from the first buffer to the second buffer, the processor does not have to continually search for the start of a portion of valid data. Additionally, the processor is not required to use unnecessary computations to skip empty spaces in the stored data. Even though there is copying of data from a first set of buffers filled by the USB stack to a second set of buffers processed by the media processing engine, there is an overall reduction in platform power consumption compared to not using the described embodiments for the same bitrate traffic. As a result, the processor may more readily enter a power conserving state, such as a high C-state, and overall power consumption for the device is improved.

Figure 5:
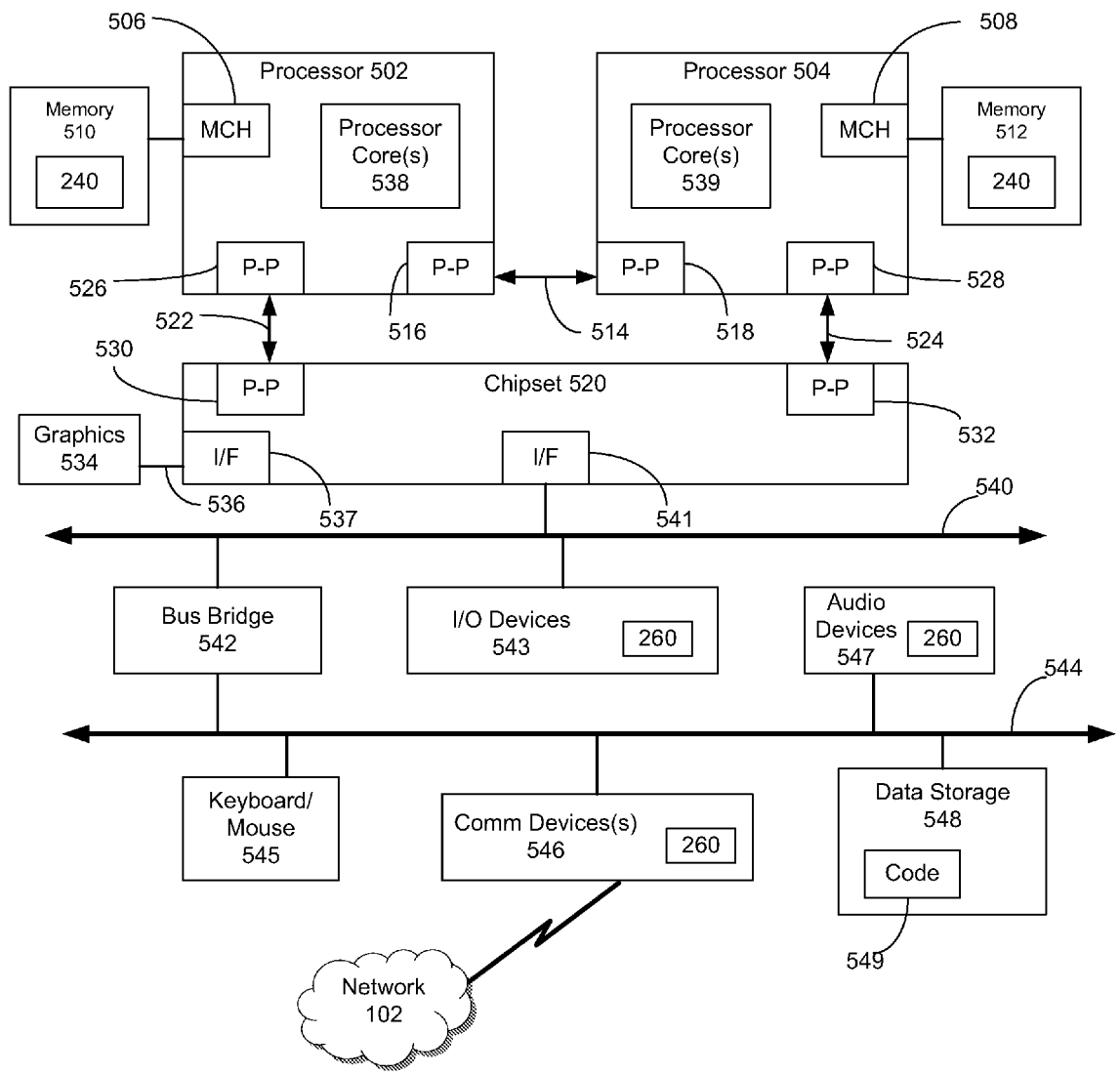
FIG. 5 illustrates a second embodiment of a second computing system.

FIG. 5 illustrates a computing system 500 that is arranged in a point-to-point (PtP) configuration, according to various embodiments. In particular, FIG. 5 shows a system where processors, memory, and input/output devices are interconnected by a number of point-to-point interfaces. One or more of the devices 104-114 discussed with reference to FIG. 1 may include the system 500. Also, the operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to couple with memories 510 and 512. The memories 510 and/or 512 may store various data such as those discussed with reference to the memory 212 of FIG. 2. For example, each of the memories 510 and/or 512 may include one or more of the O/S 232, application 234, drivers 236 and 240, and/or buffers 238.

The processors 502 and 504 may be any type of processor such as those discussed with reference to the processors 202 of FIG. 2. The processors 502 and 504 may exchange data via a point-to-point (PtP) interface 514 using PtP interface circuits 516 and 518, respectively. The processors 502 and 504 may each exchange data with a chipset 520 via individual PtP interfaces 522 and 524 using point to point interface circuits 526, 528, 530, and 532. The chipset 520 may also exchange data with a high-performance graphics circuit 534 via a high-performance graphics interface 536, using a PtP interface circuit 537.

Each of the processors 502 and 504 may include one or more processor cores 538 and 539, respectively. Various embodiments may exist in circuits, logic units, or devices within the system 500 of FIG. 5. Furthermore, other embodiments may be distributed throughout several circuits, logic units, or devices illustrated in FIG. 5.

The chipset 520 may be coupled to a bus 540 using a PtP interface circuit 541. The bus 540 may have one or more devices coupled to it, such as a bus bridge 542 and I/O devices 543. Via a bus 544, the bus bridge 542 may be coupled to other devices such as a keyboard/mouse 545, communication devices 546 (such as modems, network interface devices, etc.), an audio device 547, and/or a data storage device 548. The data storage device 548 may store code 549 that may be executed by the processors 502 and/or 504. For example, the packet 246 discussed with reference to FIG. 2 may be transmitted to or received from the network 102 by the system 500 through the communication devices 546. The packet 246 may also be received through the I/O devices 543, or other devices coupled to the chipset 520. Furthermore, in various embodiments, one or more of the I/O devices 543, communication devices 546, and/or audio devices 547 may include the firmware storage device 260.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
    receiving packets of data having multimedia information with empty spaces;
    storing the packets of data in a first buffer having a first buffer size allocated for a universal serial bus processing stack;
    removing the empty spaces from the packets of data;
    copying the packets of data having the empty spaces removed to a second buffer having a second buffer size allocated for a media information processing stack; and
    selecting the first buffer size to decrease power consumption of a processor.

2. The method of claim 1, comprising:
    sending the packets of data from the second buffer to the media information processing stack;
    retrieving the packets of data from the information processing stack for use by a processor; and
    placing the processor in a power conserving state after processing the packets of data.

3. The method of claim 1, comprising reserving bandwidth on a universal serial bus using isochronous mode.

4. The method of claim 1, comprising receiving the packets of data including variable bit rate data having multimedia information with empty spaces.

5. The method of claim 1, comprising selecting the first buffer size to be larger than the second buffer size.

6. The method of claim 1, comprising selecting the second buffer size to reduce audio latency.

7. The method of claim 1, the multimedia information comprising digital audio and digital video information.

8. An article comprising a machine-readable storage medium containing instructions that if executed enable a system to:
    receive packets of data having multimedia information with empty spaces over a universal serial bus operating in an isochronous mode;
    store the packets of data in a first buffer having a first buffer size allocated for a universal serial bus processing stack;
    copy the packets of data without the empty spaces to a second buffer having a second buffer size allocated for a media information processing stack; and
    select the first buffer size to decrease power consumption of a processor.

9. The article of claim 8, further comprising instructions that if executed enable the system to:
    send the packets of data from the second buffer to the media information processing stack;
    retrieve the packets of data from the information processing stack for use by a processor; and
    place the processor in a power conserving state after processing the packets of data.

10. The article of claim 8, further comprising instructions that if executed enable the system to reserve bandwidth on a universal serial bus using isochronous mode.

11. The article of claim 8, further comprising instructions that if executed enable the system to receive the packets of data including variable bit rate data having multimedia information with empty spaces.

12. The article of claim 8, further comprising instructions that if executed enable the system to select the first buffer size to be larger than the second buffer size.

13. The article of claim 8, further comprising instructions that if executed enable the system to select the second buffer size to reduce audio latency.

14. A method, comprising:
    receiving packets of data having multimedia information with empty spaces;
    storing the packets of data in a first buffer having a first buffer size allocated for a universal serial bus processing stack;
    removing the empty spaces from the packets of data;
    copying the packets of data having the empty spaces removed to a second buffer having a second buffer size allocated for a media information processing stack sending the packets of data from the second buffer to the media information processing stack;
    retrieving the packets of data from the information processing stack for use by a processor; and
    placing the processor in a power conserving state after processing the packets of data.

15. The method of claim 14, comprising reserving bandwidth on a universal serial bus using isochronous mode.

16. The method of claim 14, comprising receiving the packets of data including variable bit rate data having multimedia information with empty spaces.

17. The method of claim 14, comprising selecting the first buffer size to be larger than the second buffer size.

18. The method of claim 14, comprising selecting the first buffer size to decrease power consumption of a processor and selecting the second buffer size to reduce audio latency.

* * * * *

UNITED STATES PATENT AND TRADEMARK OFFICE
CERTIFICATE OF CORRECTION

PATENT NO. : 7,774,521 B1  
APPLICATION NO. : 11/966118  
DATED : August 10, 2010  
INVENTOR(S) : Ajay Gupta et al.

Page 1 of 1

It is certified that error appears in the above-identified patent and that said Letters Patent is hereby corrected as shown below:

In column 12, line 39, in claim 14, delete "stack" and insert -- stack; --, therefor.

Signed and Sealed this

Twenty-eighth Day of December, 2010

David J. Kappos
*Director of the United States Patent and Trademark Office*